United States Patent

Sheldon

[15] 3,670,497

[45] June 20, 1972

[54] COMBUSTION CHAMBER SUPPORT

[72] Inventor: Donald E. Sheldon, East Hartford, Conn.

[73] Assignee: United Aircraft Corporation, East Hartford, Conn.

[22] Filed: Sept. 2, 1970

[21] Appl. No.: 68,835

[52] U.S. Cl. .......................... 60/39.32, 60/39.66, 415/115, 415/116
[51] Int. Cl. ........................................ F02c 7/20, F02c 7/12
[58] Field of Search ........................ 60/39.66, 39.32, 39.36; 415/115, 116

[56] References Cited

UNITED STATES PATENTS

| | | | |
|---|---|---|---|
| 2,884,759 | 5/1959 | Sevcik | 60/39.32 X |
| 2,709,338 | 5/1955 | Morley et al. | 60/39.32 |
| 2,702,454 | 2/1955 | Brown | 60/39.32 X |
| 3,314,648 | 4/1967 | Howald | 415/115 |
| 3,286,461 | 11/1966 | Johnson | 60/39.66 X |
| 2,625,793 | 1/1953 | Mierley et al. | 60/39.32 X |
| 3,437,313 | 4/1969 | Moore | 415/115 |
| 2,720,080 | 10/1955 | Oulianoff et al. | 60/39.36 |
| 2,445,661 | 7/1948 | Constant et al. | 60/39.32 |

Primary Examiner—Allan D. Herrmann
Attorney—Jack N. McCarthy

[57] ABSTRACT

An annular combustion chamber having an inner and outer wall has its rear, downstream, end mounted to permit radial growth and meter cooling air to control the temperature at that location at engine operating conditions. The rear end of the outer wall is mounted to an outer casing of the engine so that it is fixed axially but permitted radial growth. An annular flange extends inwardly from the outer casing and is positioned so that at engine operating temperatures the rear end of the outer wall contacts the inner periphery of the flange. Slots are located in the inner periphery so that they meter cooling air therethrough to the inner surface of an outer shroud to which the outer ends of turbine vanes are attached. The rear end of the inner wall is mounted to an inner casing of the engine so that it is fixed axially but permitted radial growth. An annular flange extends outwardly from the inner casing and is positioned so that at engine operating temperatures the rear end of the inner wall contacts the outer periphery of the flange. Slots are located in the outer periphery so that they meter cooling air through between the outer surface of inner shrouds at which the inner ends of turbine vanes are attached. The inner and outer walls both have a slip joint connection along their length between the upstream and downstream ends.

9 Claims, 4 Drawing Figures

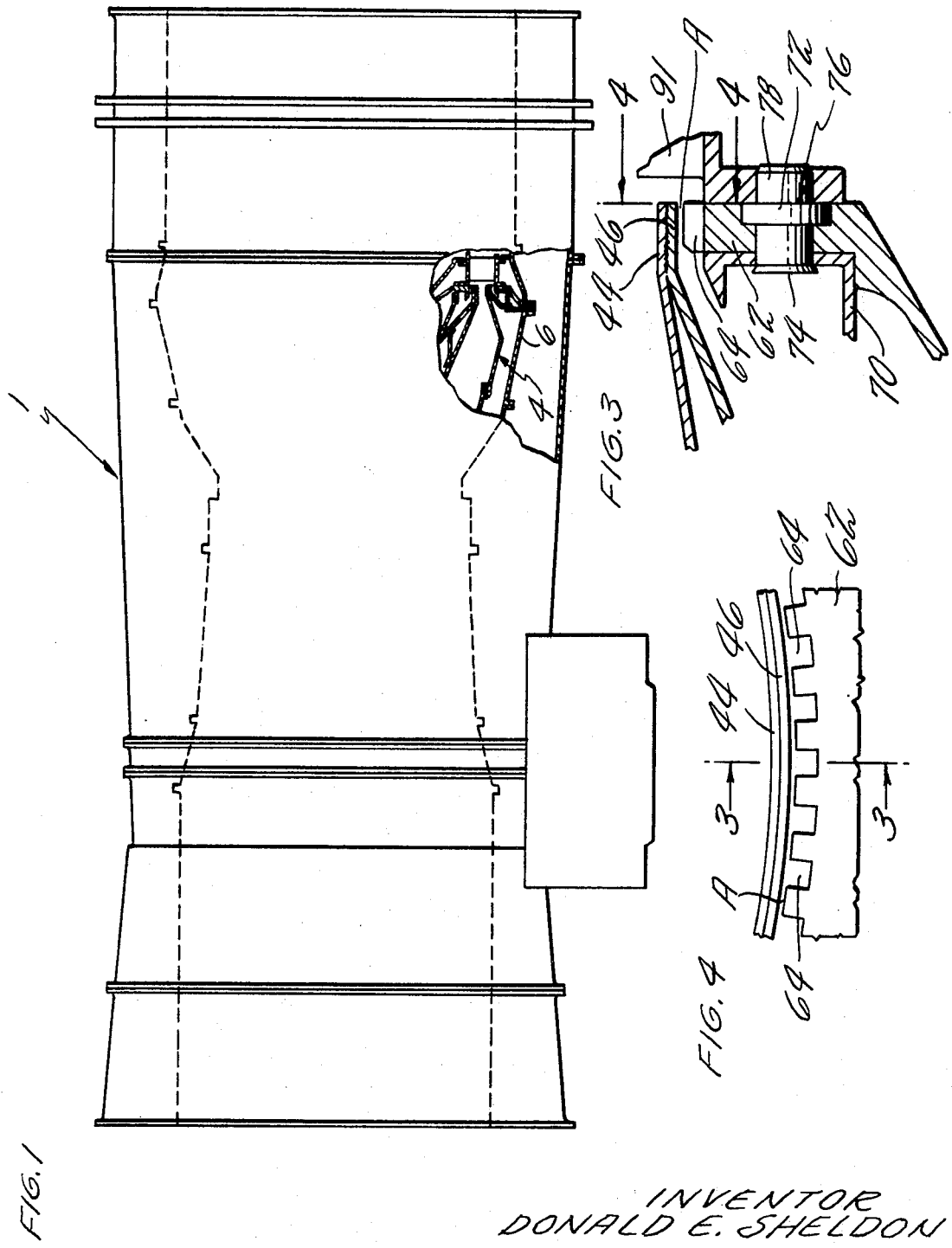

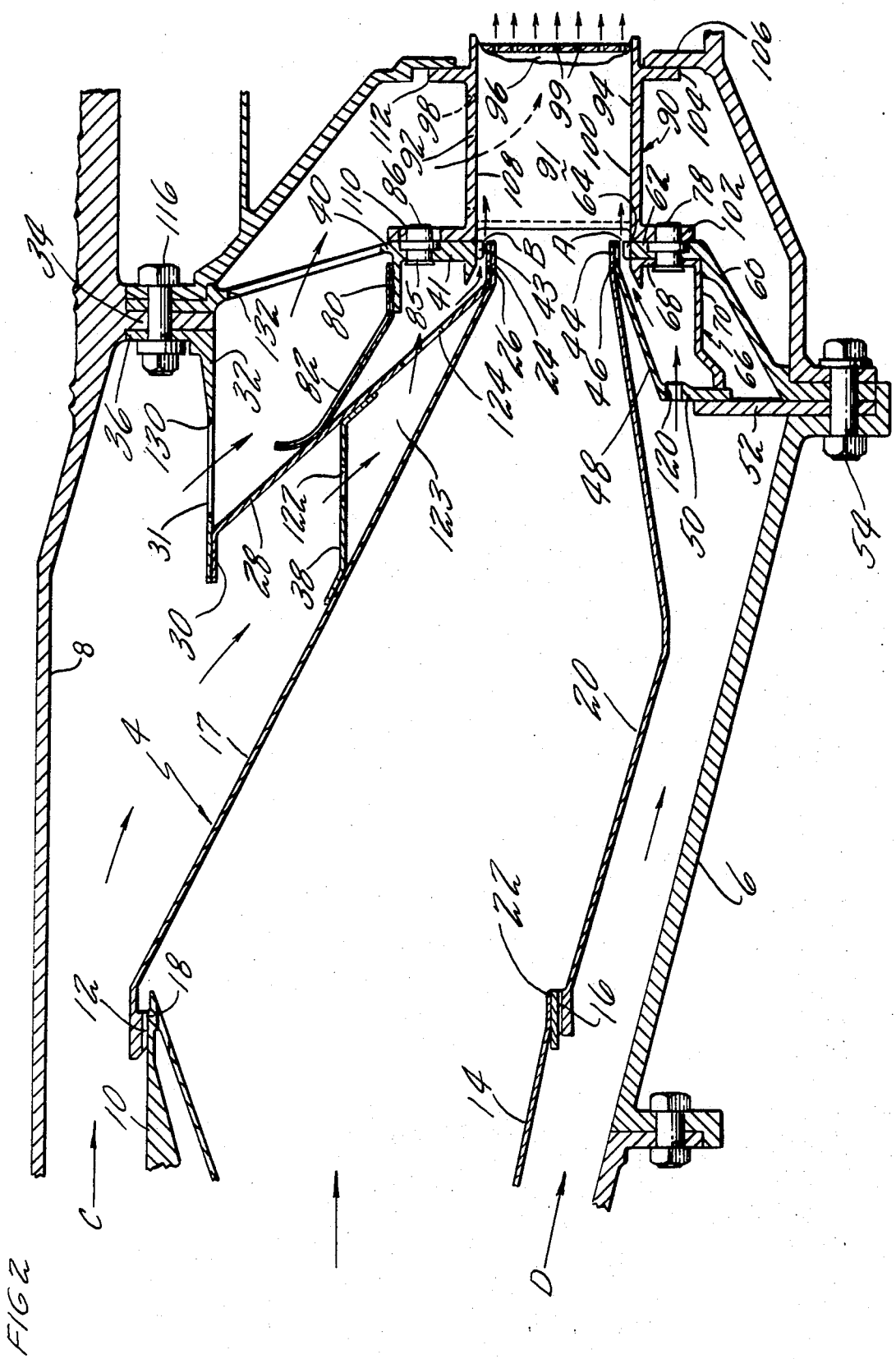

COMBUSTION CHAMBER SUPPORT

The invention herein described was made in the course of or under a contract with the Department of Air Force.

BACKGROUND OF THE INVENTION

This invention relates to combustion chambers and their support and particularly to annular combustion chambers in gas turbine engines. A support structure for a combustion chamber is shown in U.S. Pat. No. 3,186,168.

SUMMARY OF INVENTION

A primary object of this invention is to provide an improved combustion chamber rear support which will provide for metering cooling air around the rear end of the chamber and over the inner surface of the turbine shroud located rearwardly of the chamber.

Another object of the invention is to provide for radial and axial growth of the rear end of the combustion chamber so that the metering is obtained without placing undue stress on other parts of the support structure.

In accordance with a further aspect of the present invention, the metering is obtained through slots in a ring support which engages the combustion chamber when the engine is at operating temperatures. These slotted rings provide radial support for the rear of the combustion chamber. If it becomes desirable to have flow other than uniform because of hot spots, uniform temperature in the parts may be achieved by a proper selection of slots in the ring. For example, the slots could even be made larger where a hot spot occurs.

BRIEF DESCRIPTION OF THE DRAWINGS

FIG. 1 is a side elevation view of an engine broken away to show the invention. FIG. 2 is an enlarged view showing the rear portion of the combustion chamber which includes the invention.

FIG. 3 is an enlarged view of the lower rear mounting section of the combustion chamber shown in FIG. 2 and taken along line 3—3 of FIG. 4.

FIG. 4 is an enlarged view taken along the line 4—4 of FIG. 3.

DESCRIPTION OF THE PREFERRED EMBODIMENT

Referring to FIG. 2 the rear part of an annular combustion chamber 4 is shown supported between an outer casing 6 and an inner casing 8 of an engine 1. The invention resides in the mounting of the rear end of the annular combustion chamber 5. Other details of an engine, including a gas turbine engine, are known and therefore not illustrated. However, patents disclosing annular combustion chambers are the following — U.S. Pat. No. 2,720,080 and U.S. Pat. No. 3,000,183. These are cited since they show an air inlet into the chamber and on the inner and outer side thereof.

The forward part of the annular combustion chamber 4 has an inner member 10 extending rearwardly therefrom with an inner cylindrical surface 12 thereon, and an outer member 14 extending rearwardly having an outer cylindrical surface 16 thereon. The rear portion of the annular combustion chamber 4 includes an inner member 17 with an outer cylindrical surface 18 at its forward end which has a slidable engagement with the surface 12 of member 10. The rear portion of the annular combustion chamber 4 includes an outer member 20 with an inner cylindrical surface 22 at its forward end which has a slidable engagement with the surface 16 of member 14.

The outer member 20 tapers outwardly for a forward portion of its length and then tapers slightly inwardly and ends in a cylindrical flange 44. This flange is supported by the outer casing 6 in the following manner. A second cylindrical member 46 fits tight around and is fixed to cylindrical member 44. A member 48 extends forwardly from the forward end of said cylindrical member 46 and outwardly to form a cone. The outer end of the member 48 is formed having a radially extending flange 50. The forward surface of the outer portion of the radial flange 50 engages the rear outer surface of an inwardly extending radial flange 52 which extends from the outer casing 6 and is held in place between flanges on the outer casing and a plurality of bolts 54.

Another flange member 60 extends inwardly from said outer casing 6 and is held fixedly in place in the same manner by the same flanges as flange 52. The flange member 60 tapers rearwardly to a location spaced radially outwardly from the cylindrical members 44 and 46. Along this edge, the flange extends radially inwardly forming a support hoop member 62 to a location a predetermined distance A from cylindrical member 46.

The inner circumference of the support member 62 is formed having notches, or slots, 64 which provide cooling air flow passages which will be hereinafter referred to. The distance A is determined so that at engine operating temperatures, the cylindrical member 46 engages the inner circumference of the support member 62 and is actually positioned and supported thereby. A support ring member 66 is formed having an inwardly extending flange 68 and a forwardly extending flange 70. The inwardly extending flange 68 is fixed to the forward side of the flange member 60 with its rear face against the forward face of the support member 62 where these two members are held together between the flange 72 and the head 74 of a plurality of rivets 76. Each flange 72 of each of the rivets is set in a recess in the member 62. A cylindrical portion 78 of the rivet extends rearwardly of the flange 62 for a purpose to be hereinafter described.

The forwardly extending flange 70 extends to a location adjacent the rearward side of the outer edge of the radial flange 50. This permits a space between the end of the flange 70 and the rear face of the radial flange 52 in which the radial flange 50 can slide permitting radial growth of the combustion chamber yet providing axial support of the outer member 20 of the annular combustion chamber 4.

The inner member 17 tapers outwardly as it extends rearwardly and ends in a cylindrical flange 24. This flange is supported by the inner casing 8 in the following manner. A second cylindrical member 26 fits within and is fixed to cylindrical member 24. A member 28 extends forwardly from the forward end of said cylindrical member 26 and inwardly to form a cone. The inner end of the member 28 is formed having a cylindrical flange 30. A cylindrical member 32 has its forward end fixed to flange 30 and its rearward end fixed to a rigid radially extending flange 34 on the inner casing 8. This cylindrical member 32 has a plurality of openings 130 around its entire circumference which are located relatively closely together, forming narrow strips 31 which act as flexible beams permitting a difference in radial growth between the ends of the cylindrical member without putting undue stress on any engine part. This member 32 is shown fixed to flange 34 by an integral flange 36 with means to be hereinafter described.

A cylindrical member 38 extends axially between approximately the center of cone 28 and the inner member 17 of the rear portion of the annular combustion chamber 4. This member 38 is fixed at each end as by welding.

A flange member 40 extends outwardly from circular flange 34 and its outer end is spaced a predetermined distance from the inner surface of the rearward end of cylindrical member 26 to a location spaced radially inwardly from the cylindrical members 24 and 26. Along this edge, the flange extends radially outwardly forming a support hoop member 41 to a location a predetermined distance B from cylindrical member 26.

The outer circumference of the support member 41 is formed having notches, or slots, 43 which provide cooling air flow passages which will be hereinafter referred to. The distance B is determined so that at engine operating temperatures, the cylindrical member 26 engages the inner circumference of the support member 56 and is radially positioned and supported thereby. A flange 80 extends forwardly from the inner edge of member 41 and has a spring-like means 82 fixed thereto which extends toward and abuts the rear surface of cone member 28 to maintain said contact during engine operation. This spring-like means is formed of two annular members having a plurality of fingers extending forwardly. The two members are positioned so that the fingers of one cover the groove between fingers of the other. This spring-like means 82 forms a seal where it abuts to maintain a separation of airflows on either side thereof. A plurality of rivets extend around the flange 41 each with a head on the forward side and a flange located in a groove on the rearward side. A cylindrical portion 86 of the rivets extend rearwardly of the flange 41 for a purpose to be hereinafter described.

A turbine inlet vane section 90 is positioned rearwardly of the annular opening formed between cylindrical member 24 and the cylindrical member 44 to receive the combustion gases from the annular combustion chamber 4. The turbine inlet section 90 is formed having an inner shroud 92 and an outer shroud 94. A plurality of hollow vanes 91 are positioned between the inner and outer shrouds. These vanes are hollow as at 96 and have openings 98 in the inner shroud to receive cooling air in a manner to be hereinafter described. The air leaves the vanes through openings 99 in the trailing edge. The inner surface 100 of the outer shroud 94 is aligned with the bottom of the notches or slots 64 and the relationship is maintained by the positioning of an outwardly extending flange 102 on the forward part of the outer shroud which has an opening for each cylindrical portion 78 of the rivets which snugly extend thereover. This outer shroud has another flange 104 extending radially outwardly therefrom which is positioned against an inwardly extending flange 106 which is fixed to the outer casing 6.

The inner shroud 92 is positioned in the same manner with relation to the rivets 85 as the outer shroud with the exception that the holes in the inwardly extending flange 110 positioned over the cylindrical portions 86 are made large so that radial movement therebetween is permitted. The parts are dimensioned so that outer surface 108 of the shroud is in a position to receive the cooling air from the notches or slots 43 when the engine is at operating temperatures.

This inner shroud has another flange 112 extending radially inwardly therefrom which is positioned against an outwardly extending flange 114 which is fixedly connected to the flange 34. A plurality of bolts 116 fixes flanges 114, 40, 34 and 36 together in this arrangement. In operation, air enters the forward end of the annular combustion chamber 4 and cooperates with fuel and ignition means to form a combustion process. As in many burners, air also passes around the inner side at C and around the outer side at D. The air entering at D flows in the annular space between the member 20 and casing 6 to flanges 48, 50 and 52. At this point, flow passes through openings 120 in flange 50 where it is directed between members 48 and 66 to the notches, or slots, 64. A low loss annular lip, or guiding vane, extends forwardly from the inner end of flange 68 to prevent efficiency losses in flow at that location.

This air is then directed over the inner surface of the outer shroud 94. The air entering at C flows in the annular space between the member 17 and the inner casing 8 to the flange 32 portion of member 28 and member 38. At this point, flow passes through opening 122 in member 38 to the annular chamber 123 into a plurality of holes 124 formed in the lower section of the member 28 where it is directed to the notches, or slots, 43. A low loss annular lip, or guiding vane, extends forwardly from the outer end of hoop member 41 to prevent efficiency losses in flow at that location. This air is then directed to the outer surface of the inner shroud 92. The air from C also passes through openings 130 in member 32 and through openings 132 in flange 40 where it enters the openings 98 in the inner shroud 92 and passes into the vanes 91 and out the trailing edge openings 99.

I claim:

1. In combination in an engine; an outer casing, an inner casing, an annular combustion chamber positioned therebetween, said annular combustion chamber having an outer wall adjacent the outer casing and an inner wall adjacent the inner casing, means for directing air between said outer wall and said outer casing and said inner wall and said inner casing, said outer wall and inner wall each having a rear end, a first flange extending inwardly from said outer casing having an inner edge spaced outwardly a predetermined distance from the rear end of the outer wall, said space being predetermined so that the rear end of the outer wall will engage the inner edge of the first flange at operating temperatures, said inner edge of the first flange having first slots therein to permit air flow therethrough during engagement, a second flange extending outwardly from said inner casing having an outer edge spaced inwardly a predetermined distance from the rear end of the inner wall, said space being predetermined so that the rear end of the inner wall will engage the outer edge of the second flange at operating temperatures, said outer edge of the second flange having second slots therein to permit air flow therethrough during engagement.

2. A combination as set forth in claim 1 wherein the rear end of the outer wall has a conical member fixed thereto which extends forwardly and outwardly thereof, the forward end of said conical member having a flange extending radially outwardly therefrom, two members fixed with respect to the outer casing, the outer part of said flange being guided by the two members fixed to the outer casing.

3. A combination as set forth in claim 2 wherein the rear end of the inner wall has a conical member extending forwardly thereof, the forward end of said conical member being connected to the free end of a cylindrical member, the other end of said cylindrical member being fixed to said inner casing, said cylindrical member having a plurality of holes spaced around its circumference forming flexible beams to permit differential thermal expansion between each of the ends.

4. A combination as set forth in claim 2 wherein the inner part of said flange has openings therein to permit air to flow to said first slots from between said outer wall and said outer casing.

5. A combination as set forth in claim 1 wherein the rear end of the inner wall has a conical member extending forwardly thereof, the forward end of said conical member being connected to the free end of a cylindrical member, the other end of said cylindrical member being fixed to said inner casing, said cylindrical member having a plurality of holes spaced around its circumference forming flexible beams to permit differential thermal expansion between each of the ends.

6. A combination as set forth in claim 5 wherein seal means extend between said second flange and said conical member to provide inner and outer paths of air flow between said inner wall and said inner casing, said conical member having second openings located outwardly from said seal means for directing air flow through said outer path from between said inner wall and said inner casing to said second slots, turbine vanes being positioned rearwardly of said annular combustion chamber, said turbine vanes having passageways therein, said second flange having third openings located inwardly from said seal means for directing air flow through said inner path from between said inner wall and said inner casing to the passageways of said turbine vanes.

7. A combination as set forth in claim 1 wherein turbine vanes having inner and outer shrouds are positioned rearwardly of the outlet of the annular combustion chamber, said first slot being adjacent said outer shroud, said second slots being adjacent the inner shroud.

8. In combination, a combustion chamber, said combustion chamber having a downstream end, support means for the downstream end of said combustion chamber, said support means including in combination support ring means surrounding the downstream end of said combustion chamber, said ring means having an inner surface spaced from the downstream end a predetermined radial distance so that at operating temperatures said downstream end engages the surface of said ring means, said inner surface of said ring means being slotted to permit a flow of cooling air therethrough when the surface engages said downstream end of said combustion chamber.

9. A combination as set forth in claim 8 including an outer support casing wherein said ring means includes a slip joint connection with said outer support casing which provides for radial growth and retains the combustion chamber against axial movement relative to said casing.

* * * * *